United States Patent
Dickinson et al.

(10) Patent No.: US 6,726,418 B2
(45) Date of Patent: Apr. 27, 2004

(54) SPRING FASTENER FOR CONNECTING AUTOMOTIVE COMPONENTS AND OTHER ARTICLES

(75) Inventors: Daniel James Dickinson, Arlington Heights, IL (US); Michael Walter Smith, Lake Zurich, IL (US); Eustathios Vassiliou, Newark, DE (US)

(73) Assignee: Eustathios Vassiliou Revocable Trust, Newark, DE (US)

( * ) Notice: Subject to any disclaimer, the term of this patent is extended or adjusted under 35 U.S.C. 154(b) by 0 days.

(21) Appl. No.: 10/213,217

(22) Filed: Aug. 6, 2002

(65) Prior Publication Data

US 2003/0053884 A1 Mar. 20, 2003

Related U.S. Application Data

(60) Provisional application No. 60/323,240, filed on Sep. 19, 2001.

(51) Int. Cl.$^7$ ............................................. F16B 37/04
(52) U.S. Cl. ................................... 411/182; 411/179
(58) Field of Search ........................... 411/179, 180, 411/182, 477, 478

(56) References Cited

U.S. PATENT DOCUMENTS

| | | | |
|---|---|---|---|
| 2,181,966 A | 12/1939 | Dean | 85/5 |
| 2,376,167 A | 5/1945 | Mitchell | 85/36 |
| 2,430,555 A | 11/1947 | Burke | 85/36 |
| 2,707,013 A | 4/1955 | Flora et al. | 151/41.75 |
| 3,426,817 A | 2/1969 | Parkin et al. | 151/41.75 |
| 3,486,158 A | 12/1969 | Soltysik et al. | 339/14 |
| 3,505,922 A | 4/1970 | Tinnerman | 85/83 |
| 4,430,033 A * | 2/1984 | McKewan | 411/61 |
| 4,495,380 A | 1/1985 | Ryan et al. | 174/138 |
| 4,500,238 A | 2/1985 | Vassiliou | 411/30 |
| 4,595,325 A | 6/1986 | Moran et al. | 411/173 |
| 4,610,588 A | 9/1986 | Van Buren, Jr. et al. | 411/173 |
| 5,129,768 A | 7/1992 | Hoyle et al. | 411/182 |
| 5,249,900 A | 10/1993 | Mitts | 411/182 |
| 5,314,280 A | 5/1994 | Gagliardi et al. | 411/182 |
| 5,536,125 A | 7/1996 | Gaw, Jr. | 411/182 |
| 5,632,584 A | 5/1997 | Acevedo | 411/182 |
| 5,636,891 A | 6/1997 | Van Order et al. | 296/37.7 |
| 5,725,343 A * | 3/1998 | Smith | 411/55 |
| 5,759,004 A * | 6/1998 | Kuffel | 411/508 |
| 5,774,949 A * | 7/1998 | Cornell et al. | 24/293 |
| 5,873,690 A | 2/1999 | Danby et al. | 411/55 |
| 5,919,019 A * | 7/1999 | Fischer | 411/182 |
| 6,095,734 A | 8/2000 | Postadan et al. | 411/182 |
| 6,179,366 B1 | 1/2001 | Hansz | 296/97.9 |

* cited by examiner

*Primary Examiner*—Heather Shackelford
*Assistant Examiner*—Lisa M. Saldano
(74) *Attorney, Agent, or Firm*—E. Vassiliou

(57) ABSTRACT

This invention pertains fasteners which are characterized by easy insertion and extraordinarily difficult separation of items that they attach together. This is achieved by a combination of snapping segments with an elastic body disposed at least under the head of the fastener. The snapping segments may comprise anti-opening and/or anti-sliding portions, which immensely increase the strength with which the fasteners hold the objects together. The elastic body in the vicinity of the bottom section of the fasteners also provides water and gas proof properties, as well as elimination of squeaking noises. Vehicles comprising objects connected together by the fastening devices described and claimed herein are part of the instant invention.

18 Claims, 3 Drawing Sheets

SPRING FASTENER FOR CONNECTING AUTOMOTIVE COMPONENTS AND OTHER ARTICLES

RELATED APPLICATIONS

This application claims priority of provisional patent application No. 60/323,240, filed on Sep. 19, 2001, which is incorporated herein by reference in its entirety.

FIELD OF THE INVENTION

This invention pertains fasteners, and more particularly fasteners which attach one object to another object, with special emphasis to objects in the Automotive Industry.

BACKGROUND OF THE INVENTION

In the original conventional technology of fasteners employed to securely attach one object to another, such as for example one part to another in the case of an automobile or an appliance, has utilized a nut on one of the two objects, usually welded or glued to the back of said object, and a bolt passing through a hole on the second object in a manner to be engaged by the nut, thereby securing the two objects together.

This arrangement presents many problems, among which, one of the most important is that in the case that one object is hollow, the nut has to be in place at the back of the hollow object before assembling the two objects together. If for any reason the nut is misplaced, and/or if it becomes desirable to introduce a new fastening connection between the two objects, the task of achieving such connection becomes very difficult if not impossible for all practical purposes.

The so-called "quick nuts" have also been used to connect two objects. In addition, vibration during the operation of a device, such as an automobile or appliance for example, containing the two objects results very often in loosening of the bolt or "quick nut" and in either full disassembling of the objects from each other, or in a vibration noise which is most annoying and often of unacceptable levels.

Fasteners of the type described in U.S. Pat. No. 4,500,238 (Vassiliou) have been utilized to reduce considerably the potential of bolt or screw loosening and vibration. They have also eliminated the problem of having to place one member of the fastener at the back portion of the hollow object. These fasteners are placed through a slot from the front part of the hollow object. An expanding member, being usually a bolt or a screw, supports the second object by forcing the legs of the fastener (as described for example in U.S. Pat. No. 4,500,238) to open or expand, thereby securing the two objects together. The legs of the fasteners are supported by a double-layered head having an upper side and a lower side joined by side bents. The fasteners of this type have greatly improved the prevailing torque, as well as the pulling force of the system. Prevailing torque is the torque required to render a screw loose. Pulling force is the pulling force applied on the screw to the point of failure, which usually occurs at the bents.

Other references representing the state of the art at this point are disclosed in U.S. Pat. Nos. 6,179,366 B1, 6,095, 734, 5,919,019, 5,873,690, 5,759,004, 5,725,343, 5,636,891, 5,632,584, 5,336,125, 5,314,280, 5,249,900, 5,129,768, 4,610,588, 4,595,325, 4,495,380, 3,505,922, 3,486,158, 3,426,817, 2,707,013, 2,430,555, 2,376,167 and 2,181,966.

SUMMARY OF THE INVENTION

This invention pertains fasteners, and more particularly fasteners which attach one object to another object, with special emphasis to objects in the Automotive Industry. More particularly, this invention pertains a spring fastener comprising:

a head portion having an upper side, and a lower side, the upper side having an engageable hole on which a securing member can engage and pass through;

an elastic body disposed at least under the lower side of the head portion; and a body portion extending from the lower side of the head portion at a substantially right angle with respect to the head portion, the body portion comprising a front body portion and a back body portion, the front body portion and the back body portion being at least partially in proximity with each other;

a front opening on the front body portion and a back opening on the back body portion, each of the openings having a respective opening bottom a respective opening top, a first opening side and a second opening side;

a side body portion on each opening side;

a front snapping segment connected to the front body portion in the vicinity of the opening bottom, and having a front free engagement end; and a back snapping segment connected to the back portion in the vicinity of the opening bottom, and having a back free engagement end.

The presence of the elastic body at least under the lower side of the head of the fastener is of extreme importance, since, unexpectedly, in addition to its excellent sealing properties allows the snapping segments to freely pass through the slot of an object, and then to snuggly contact the lower surface of said object, a necessary requirement to prevent unacceptable rattling.

The lower side of the head may have a secondary engagement section, and at least one of the side body portions may have a tertiary engagement section.

At least one of the free engagement ends may comprise a section selected from anti-sliding section, anti-opening section, and a combination thereof.

At least one snapping segment may be disposed at least partially along the respective side body portion and/or the respective opening.

Vehicles comprising the spring fasteners of this invention, connecting two parts, one of the parts comprising a slot in which the fastener is secured by the snapping segment, are also included within the scope of the instant invention. Thus, automobiles or other vehicles may be made, comprising one or more of the fasteners of the instant invention, providing substantial improvements regarding safety, performance and comfort.

BRIEF DESCRIPTION OF THE DRAWING

The reader's understanding of this invention will be enhanced by reference to the following detailed description taken in combination with the drawing figures, wherein.

DETAILED DESCRIPTION OF THE INVENTION

As aforementioned, this invention pertains fasteners, and more particularly fasteners which attach one object to another object, with special emphasis to objects in the Automotive Industry.

As also mentioned earlier, there is a need to have one or more fasteners attached to a large first object, such as a headliner or roof-rack of a car for example, and then attach this large first object to second object, such as the inside or outside of the roof of a car, respectively, for example, by inserting at least part of the fastener into the second object, through a slot for example. An additional requirement many times is to use a rather light force for the insertion, but to require an extraordinarily high force to separate the two objects, if the fastener is not first removed, by unthreading for example a bolt or a screw which attaches the fastener to the first object. A further requirement in many occasions is that after unthreading the bolt or screw, the fastener remains attached to the second object. In other occasions, however, it is required that the two objects are separated by pulling one object away from the other object, without performing other action, such as unthreading a screw or a bolt. Another requirement in a plurality of application is that the fastener has to be attached to a specified position on the first object, and not allowed to turn. The configuration should be such that the screw or bolt could hold additional object(s), such as a car handle for example.

This invention provides fasteners which have the configurations required to satisfy the above need.

Figure 1:
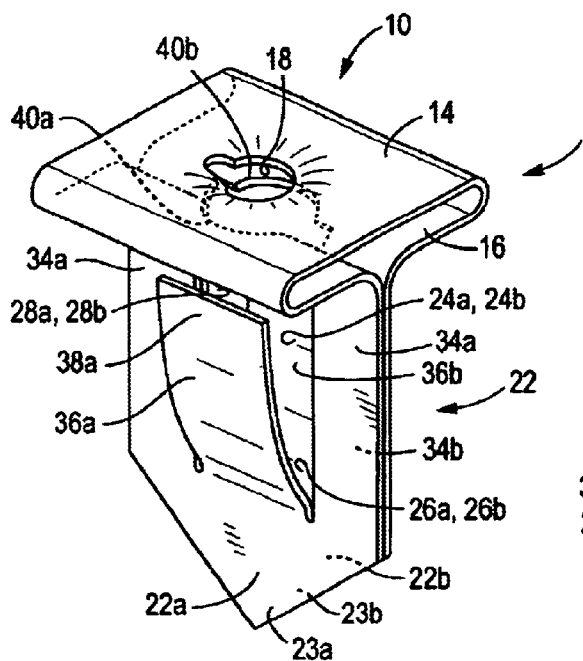
FIG. 1 illustrates a perspective view of a spring fastener in the absence of the elastic body according to a preferred embodiment of the present invention.

Referring now to FIG. 1, there is depicted, in a perspective view, a spring fastener 10 according to a preferred embodiment of the instant invention. The fastener 10 comprises a head portion 12 having an upper side 14, and a lower side 16. The upper side has an engageable hole 18 on which a securing member 20 (shown in FIG. 5) can engage and pass through.

An elastic body 44 (illustrated in FIGS. 4 and 5), necessary for this invention has been omitted from the rest of the Figures for clarity purposes.

Figure 4:
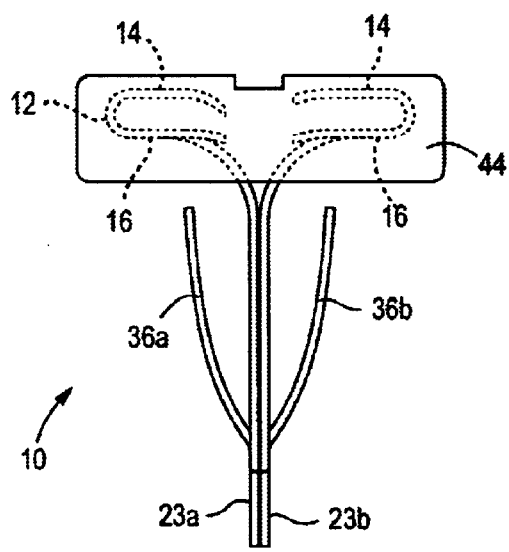
FIG. 4 illustrates a front view of a spring fastener of the instant invention, illustrating the elastic body in the region of the head portion.

The elastic body 44 of this invention, better shown in FIG. 4, is disposed at least under the lower side 16 of the head portion 12. Such elastic bodies are preferably integrally molded at least at the lower side of the head portion 12, and preferably around the whole head 12. These elastic bodies are for example disclosed in U.S. Pat. Nos. 5,725,343, and 6,379,092, both of which are incorporated herein by reference.

Figure 2:
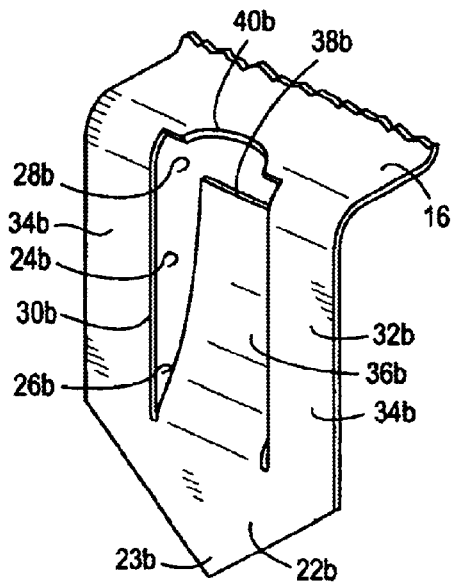
FIG. 2 illustrates a fragmental perspective view of the back body portion and part of the lower side of the head portion of the fastener of FIG. 1 in the absence of the elastic body.

In FIG. 2, there is depicted a fragmental view of a back lower body 22b as well as portion of the lower head side 16 of the fastener 10, as explained hereinbelow.

The spring fastener 10 comprises a body portion 22, which extends from the lower side 16 of the head portion 12 at a substantially right angle with respect to the head portion 12.

The body portion 22 has a front body portion 22a (better shown in FIG. 1) and the back body portion 22b (better shown inn FIG. 2). The front body portion 22a and the back body portion 22b are at least partially in proximity with each other.

For purposes of clarity, in the following discussion and in the Figures, numerals followed by the letter "a" refer to the front body portion 22a of the body portion 22, and numerals followed by the letter "b" refer to the back body portion 22b of the body portion 22. The two elements corresponding to the body portion 22 are referred to collectively as the respective numeral without the letter.

The front body portion 22a has a front opening 24a, and the back body portion 22b has back opening 24b. Each of the openings 24a and 24b has a respective opening bottom 26a and 26b, and a respective opening top 28a and 28b. Each of the openings 24a and 24b also has a respective first opening side 30a and 30b and a respective second opening side 32a and 32b.

The front body portion 22a has side body portions 34a, while the back body portion 22b has side body portions 34b.

The body portion 22 further comprises a front snapping segment 36a connected to the front body portion 22a in the vicinity of the opening bottom 26a, and having a front free engagement end 38a. The body portion 22 also comprises a back snapping segment 36b connected to the back body portion 22b in the vicinity of the opening bottom 26b, and having a back free engagement end 38b.

The spring fasteners of the present invention may have a secondary engagement section at the lower side 16 of the head portion 12. The secondary engagement section 40 comprises two arcs, 40a and 40b, which are capable to engage to the securing member 20 (FIG. 5), such as a screw or bolt for example. This arrangement provides increased pulling force, which is the force required to remove the securing member 20 from the spring fastener by pulling them apart.

Figure 3:
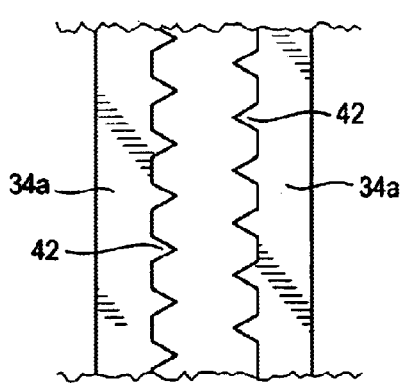
FIG. 3 illustrates a front view of the side body portions comprising threading teeth according to another preferred embodiment of the instant invention.
Figure 13:
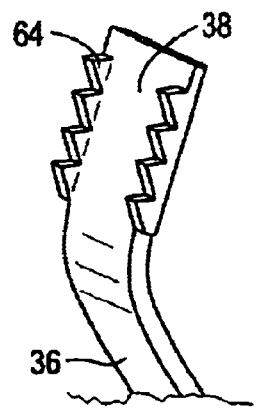
FIG. 13 illustrates a perspective view of a snapping segment configuration involving an anti-sliding front engagement end according to still another embodiment of the instant invention.

At least part of the side body portions 34a and 34b may comprise threading teeth 42, which create a tertiary engagement section, as better shown in FIG. 3. The threading teeth 42 engage the securing member 20 (FIG. 5), thus also providing increased pulling force. The threading teeth may be on the same plane as the respective side body portions 34a and 34b or bent to a certain degree in a manner to nest better the threads of the securing member 20. Further, the angles of the front and the back sides of the teeth may be such as to favor easy insertion and difficult removal of the fastener, in a similar manner as the bent teeth 64 (FIG. 13, and applications incorporated by reference) discussed at a later point.

Complementary engagement mechanisms which may be used in the present invention, if so desired, are described in provisional applications 60/167,080 (filed Nov. 23, 1999), 60/169,447 (filed Dec. 7, 1999), 60/170,611 (filed Dec. 14, 1999), and 60/179,834 (filed Feb. 2, 2000), and non-provisional application Ser. No. 09/699,760 (filed Oct. 30, 2000), all of which are incorporated herein by reference.

Figure 5:
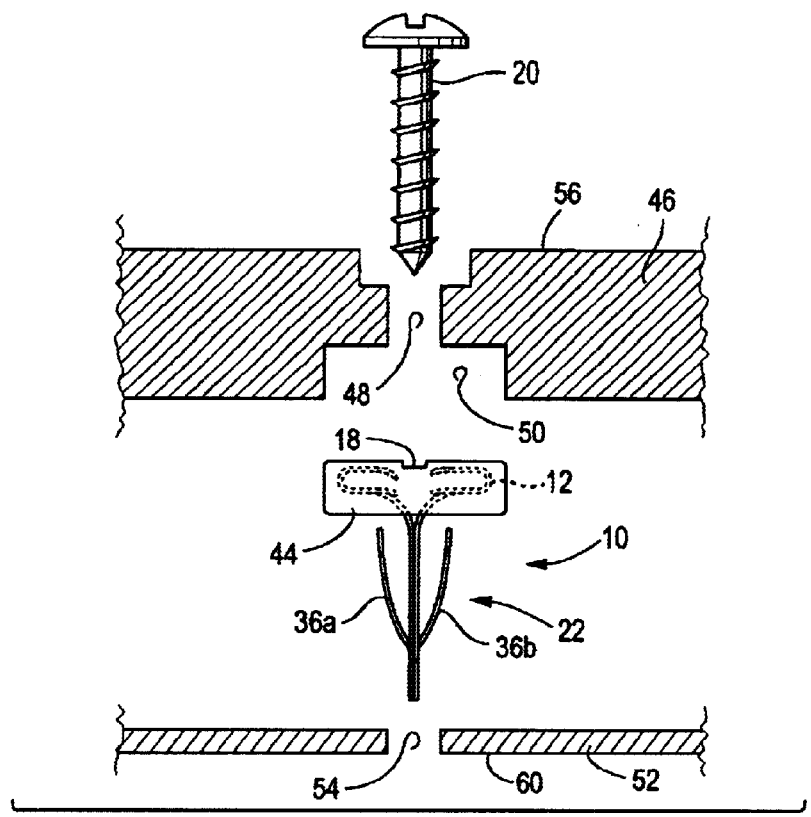
FIG. 5 illustrates the operation of the fasteners of the instant invention.

The fastener 10 also has an insertion region 23 (23a and 23b), which may be covered by a soft material, such as a plastic for example, in order to avoid scratching the surface of a part, such as the second object 52 for example shown in FIG. 5.

The operation of the above embodiments is better illustrated in FIG. 5.

The fastener 10 is secured on a first object 46, such as a roof-rack or headliner for example, by passing a securing member, such as a screw or bolt 20, for example, through hole 48 of the first object 46, and threading said screw or bolt 20 on the engageable hole 18. If the secondary and/or tertiary and/or other engagement sections are present, as for example described above, the securing member is engaged on these engagement sections, too.

The first object 46 has preferably a recessed region 50 under the hole 48, which serves to align and/or nest partially or totally the head portion 12 and/or the elastic body 44. A deeper recessed region 50 allows the distance between the upper side 14 and the lower side 16 of the head portion to be large enough so that the curved regions joining the two sides are adequately gradual, thus providing considerably higher structural strength.

One or more additional objects, such as a handle (not shown) for example, may also be secured by the same securing member 20 by passing said securing member through a hole (not shown) belonging to the additional object(s). More than one fasteners may be secured in a similar manner on the first object 46. Such combinations may form an assembly, such as a roof-rack or headliner assembly for example.

It is important that the length of the securing member is long enough for any desired engagements, but have a shorter length than a length which would exceed the opening bottom 26, and thus cause any appreciable opening of the body portions 22a and 22b.

The assembly, such as a roof-rack or headliner assembly for example, which usually comprises more than one secured and aligned fasteners 10 in predetermined positions, is pushed by the operator against a second object, such as for example metal sheet 52, which can be in the form of a framework in the vicinity of the roof or ceiling of the outside or inside region of a vehicle for example, having properly arranged slots 54 to accept body portion 22 of the fattener 10. Other material may replace, however, the metal, and it should be understood throughout this disclosure that when referring to metal sheet, any other suitable material may replace the metal, or any other object or combination of objects may replace the sheet.

As the body portion 22 of the fastener 10 is being pushed through the slot 54, the snapping segments 36a and 36b are inwardly pushed until they reach a position at which the body portion is allowed to pass through the slot 54, at which point the elastic body 44 has been compressed to a desired degree. When the body portion 22 of the fastener 10 has reached its final position, the snapping segments 36a and 36b snap back. In sequence, the insertion force is released, allowing the elastic body 44 to expand to a desired degree, and thus, the fastener 10, as well as the whole assembly, are secured onto the metal sheet 52.

The elastic body serves also as an excellent insulator for gases and liquids, and as a noise damper.

A number of parameters determine the force needed to insert the assembly into the slot 54. These include but are not limited to the thickness, hardness and spring characteristics of the folded sheet metal from which the fastener is made, the shape and dimensions of the fastener, the length and width of the snapping segments, the angle formed by the left and right sections with the respective snapping segments, the dimensions of the slot 62, the thickness and elasticity of the elastic body, etc. For each particular application, these parameters may be determined experimentally, or by engineering calculations, or a combination thereof without undue effort.

The force to separate the assembly from the metal sheet 52 is manifold higher than the insertion force, due to the critical configurations of the instant invention, and it depends on the above parameters, but also on the characteristics of the screw or bolt 48, the characteristics of the engageable hole or sections or other engageable elements of the fastener, etc. The multiplicity of engageable features of the fastener of the present invention, are critical in considerably increasing the ratio of the separating force to the insertion force.

The utilization of more than one engageable sections is important not only for adequately strong attachment of the fastener 10 to the first object, directly or indirectly, in a manner to form an assembly, but also to combine very easy insertion of the fastener into the slot 54 of the metal sheet 52 with extremely difficult separation of the assembly from the metal sheet after the easy insertion has taken place. The importance of adequately strong attachment, despite the easy insertion, becomes even more important when a larger number of objects, and/or more demanding objects have to be supported by the fastener 10. This is especially so in the case that a given additional object (not shown for purposes of clarity), such as an air-bag system for example, has to be attached to the upper side 56 of the first object 46.

If service is needed, and partial or total removal of the assembly of elements from the metal sheet 52 is needed, the screw(s) or bolt(s) 20 are unthreaded, and the assembly is freed from the metal sheet 52, with the fastener, however, attached now to the metal sheet 52. After the service, the elements may be attached in their initial position by using the screw or bolt 20 as shown in FIG. 5.

Figure 6:
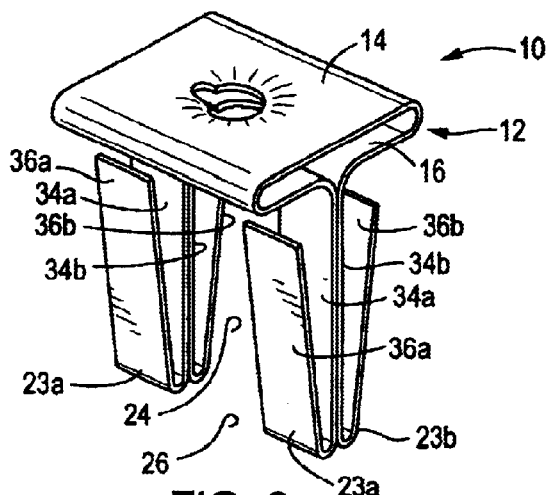
FIG. 6 illustrates a spring fastener according to another embodiment of the present invention in the absence of the elastic body.

In a different embodiment of the instant invention, better shown in FIG. 6, the snapping segments 36a and 36b are disposed along the side body portions 34a and 34b, respectively. The fastener 10, in this case also, may have secondary and tertiary engagement sections as well as other additional engagement sections (not shown).

As better illustrated in FIG. 6, this embodiment is characterized by
  (a) front snapping segments 36a being upward bent extensions of respective front body portions 34a in the vicinity of the opening bottom 26, disposed along said respective front body portions 34a, and
  (b) back snapping segments 36b being upward bent extensions of respective back body portions 34b in the vicinity of the opening bottom 26, disposed along said respective back body portions 34b.

The operation of this embodiment is substantially the same as the operation of the above embodiments, with the difference that the snapping segments 36a and 36b are disposed along the side body portions 34a and 34b instead along the opening 24.

Figure 7:
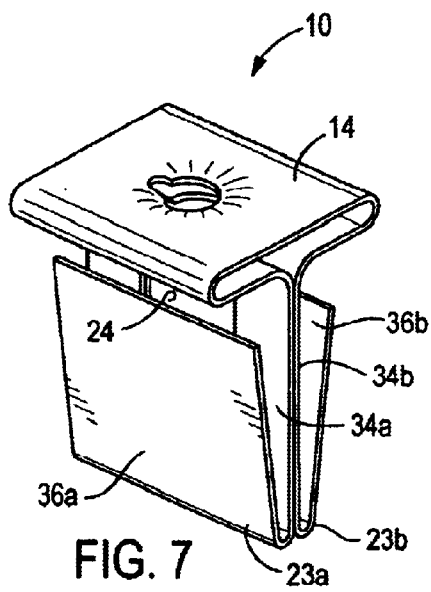
FIG. 7 illustrates a spring fastener according to still another embodiment of the present invention in the absence of the elastic body.

In still a different embodiment of the instant invention, better shown in FIG. 7, the snapping segments 36a and 36b are disposed not only along the side body portions 34a and 34b, but also along the opening 24 in a continuous manner.

The operation of this embodiment is substantially the same as the operation of the above embodiments, with the difference that the snapping segments 36a and 36b are disposed along the side body portions 34a and 34b, as well as along the opening 24 in a continuous manner.

The snapping segments of this invention may have different configurations, including but not limited to straight and curved.

Figure 8:
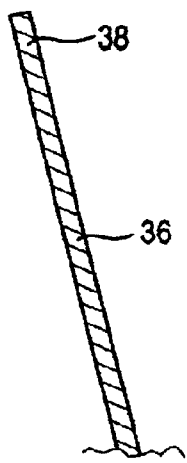
FIG. 8 illustrates a cross section of a straight snapping segment configuration according to another embodiment of the instant invention.

One example is shown in FIG. 8, wherein the snapping segment 36 has a substantially linear configuration with a free engagement end 38 as being a linear extension of the snapping segment 36.

Figure 9:
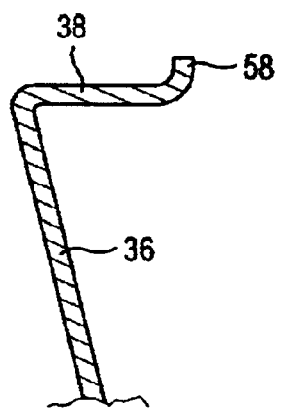
FIG. 9 illustrates a cross section of a snapping segment configuration involving an anti-opening front engagement end according to another embodiment of the instant invention.
Figure 10:
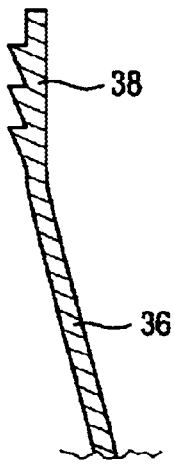
FIG. 10 illustrates a cross section of a snapping segment configuration involving an anti-sliding front engagement end according to another embodiment of the instant invention.

In order to provide anti-opening properties to the snapping segment 36, an anti-opening configuration can be used, such as the one shown in FIG. 9, for example. When the snapping segment tends to open, the prong 58, which resides within the slot 54 (FIG. 5) during the operation, prevents such opening. This particular configuration is preferable when the failure is due to the snapping segments 36 having a tendency to open (move away from the slot on and parallel to the lower surface 60 of the sheet metal 52) when a separation force is applied between the first object 46 and the metal sheet 52 (see FIG. 5)

Figure 11:
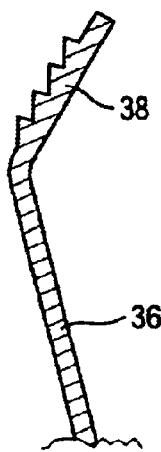
FIG. 11 illustrates a cross section of a snapping segment configuration involving an anti-sliding front engagement end according to still another embodiment of the instant invention.
Figure 12:
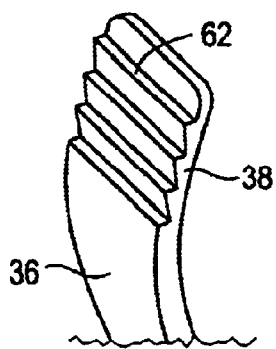
FIG. 12 illustrates a perspective view of a snapping segment configuration involving an anti-sliding front engagement end according to still another embodiment of the instant invention.

Anti-sliding properties (preventing the snapping segments 36 from sliding through the slot 54 when a separation force is applied between the first object 46 and the metal sheet 52—see FIG. 5) may be provided, especially in the case that the free engagement end 38 forms an angle with the rest of the engagement segment 36, as illustrated for example in FIG. 11, for multi-position engagement on the slot 54. Perspective views of examples of anti-sliding configurations are shown in FIG. 12 (ripples 62 on the free engagement end 38) and in FIG. 13 (bent teeth 64 on the free engagement end 38).

It is important to note that even in the case that the free engagement end 38 is parallel to the side body portions 34 when it resides in the slot 54 (not completely passed through the slot in its final position), it can hold the first object and the metal sheet together in the case of presence of ripples 62 and/or bent teeth 38.

Further, the securing member 20 itself hinders the sliding of the snapping segments out of the slot 54.

Other examples of anti-opening and anti-sliding configurations, and more details regarding their structure, as well as other types of spring fasteners having snapping segments are disclosed in non-provisional application Ser. No. 09/969,563 (Publication No. 2002/0054808; Publication date: May 9, 2002) and provisional applications 60/246,634 (filed Nov. 8, 2000), 60/249,996 (filed Nov. 20, 2000), 60/267,281 (filed Feb. 8, 2001), 60/283,266 (filed Apr. 12, 2001), 60/289,343 (filed May 7, 2001), 60/302,194 (filed Jun. 29, 2001), 60/301,164 (filed Jun. 25, 2001), 60/308,921 (filed Jul. 31, 2001), 60/310,343 (filed Aug. 6, 2001), and 60/312,867 (filed Aug. 16, 2001), all of which are incorporated herein by reference.

Vehicles comprising the spring fasteners of this invention, connecting two parts, one of the parts comprising a slot in which the fastener is secured by the snapping segment, are also included within the scope of the instant invention. Thus, automobiles or other vehicles may be made, comprising one or more of the fasteners of the instant invention, providing substantial improvements regarding safety, performance and comfort.

Examples of embodiments demonstrating the operation of the instant invention, have now been given for illustration purposes only, and should not be construed as restricting the scope or limits of this invention in any way.

Any feature(s) described in one of the exemplary embodiments may be combined with any features incorporated in any other exemplary embodiment according to this invention.

Any explanations given are speculative and should not restrict the scope of the claims.

What is claimed is:

1. A spring fastener comprising:
   a head portion having an upper side, and a lower side, the upper side having an engageable hole on which a securing member can engage and pass through;
   an elastic body disposed at least under the lower side of the head portion; and
   a body portion extending from the lower side of the head portion at a substantially right angle with respect to the head portion, the body portion comprising
      front body portions and back body portions, the front body portions and the back body portions being at least partially in proximity with each other;
      a front opening on the front body portions and a back opening on the back body portions, each of the openings having a respective opening bottom, a respective opening top, a first opening side and a second opening side;
      a side body portion on each opening side;
      front snapping segments being upward bent extensions of respective front body portions in the vicinity of the opening bottom, disposed along said respective front body portions; and
      back snapping segments being upward bent extensions of respective back body portions in the vicinity of the opening bottom, disposed along said respective back body portions.

2. A spring fastener as defined in claim 1, wherein the lower side of the head comprises a secondary engagement section.

3. A spring fastener as defined in claim 2, wherein at least one snapping segment is disposed at least partially along the respective opening.

4. A spring fastener as defined in claim 2, wherein the at least one of the free engagement ends comprises a section selected from anti-sliding section, anti-opening section, and a combination thereof.

5. A spring fastener as defined in claim 1, wherein at least one of the side body portions comprises a tertiary engagement section.

6. A spring fastener as defined in claim 5, wherein the at least one of the free engagement ends comprises a section selected from anti-sliding section, anti-opening section, and a combination thereof.

7. A spring fastener as defined in claim 5, wherein at least one snapping segment is disposed at least partially along the respective opening.

8. A spring fastener as defined in claim 1, wherein the at least one of the free engagement end comprises a section selected from anti-sliding section, anti-opening section, and a combination thereof.

9. A spring fastener as defined in claim 1, wherein at least one snapping segment is disposed at least partially along the respective opening.

10. A vehicle comprising a first object and a second object, the first object having a hole, and the second object having a slot, the first and second objects connected with a spring fastener, the spring fastener comprising:
- a head portion having an upper side, and a lower side, the upper side having an engageable hole on which a securing member can engage and pass through;
- an elastic body disposed at least under the lower side of the head portion; and
- a body portion extending from the lower side of the head portion at a substantially right angle with respect to the head portion, the body portion comprising
  - front body portions and back body portions, the front body portions and the back body portions being at least partially in proximity with each other;
  - a front opening on the front body portions and a back opening on the back body portions, each of the openings having a respective opening bottom, a respective opening top, a first opening side and a second opening side;
  - a side body portion on each opening side;
  - front snapping segments being upward bent extensions of respective front body portions in the vicinity of the opening bottom, disposed along said respective front body portions; and
  - back snapping segments being upward bent extensions of respective back body portions in the vicinity of the opening bottom, disposed along said respective back body portions.

11. A vehicle as defined in claim 10, wherein the lower side of the head of the spring fastener has a secondary engagement section.

12. A vehicle as defined in claim 11, wherein at least one snapping segment is disposed at least partially along the respective opening.

13. A vehicle as defined in claim 11, wherein the at least one of the free engagement ends of the snapping segments of the spring fastener comprises a section selected from anti-sliding section, anti-opening section, and a combination thereof.

14. A vehicle as defined in claim 10, wherein at least one of the side body portions of the spring fastener has a tertiary engagement section.

15. A vehicle as defined in claim 14, wherein the at least one of the free engagement ends of the snapping segments of the spring fastener comprises a section selected from anti-sliding section, anti-opening section, and a combination thereof.

16. A vehicle as defined in claim 14, wherein at least one snapping segment is disposed at least partially along the respective opening.

17. A vehicle as defined in claim 10, wherein the at least one of the free engagement ends of the snapping segments of the spring fastener comprises a section selected from anti-sliding section, anti-opening section, and a combination thereof.

18. A vehicle as defined in claim 10, wherein at least one snapping segment is disposed at least partially along the respective opening.

* * * * *